ROLAND J. HAWES, JR.
WELLINGTON C. PIERCE
INVENTORS

BY BUCKHORN, BLORE, KLARQUIST & SPARKMAN
ATTORNEYS

United States Patent Office 3,437,075
Patented Apr. 8, 1969

3,437,075
METHOD AND APPARATUS FOR ADMINISTERING FEED ADDITIVES TO LIVESTOCK AND POULTRY
Roland J. Hawes, Jr., and Wellington C. Pierce, Boise, Idaho, assignors, by mesne assignments, to Roland J. Hawes, Jr.
Continuation-in-part of application Ser. No. 472,207, July 15, 1965. This application Jan. 29, 1968, Ser. No. 709,850
Int. Cl. A01k 5/02, 7/02
U.S. Cl. 119—51      22 Claims

ABSTRACT OF THE DISCLOSURE

A method and apparatus whereby livestock and poultry are administered feed additives in their drinking water or feed ration. The apparatus stores additive concentrates separately until just prior to use, then on demand measures and dispenses the additive concentrates separately but simultaneously into a flow of water or other fluent carrier. The carrier flows continuously to an additive receiving station, which may be a pressure tank or drinking water trough if the carrier is drinking water, or which may be a feed mill if the carrier is water, molasses or other fluent, consumptive carrier material.

---

This application is a continuation-in-part of prior copending application Ser. No. 472,207, now abandoned filed July 15, 1965, and entitled "Method and Apparatus for Feeding Livestock and Poultry."

FIELD OF THE INVENTION

The present invention relates to the administering of feed additives to livestock and poultry, and more particularly to a method of and apparatus for supplementing the diets of livestock and poultry with feed additives such as nutrients and medicines supplied in a consumptive fluent carrier such as water or molasses.

For convenience, hereinafter the term "livestock" shall include all domesticated animals and poultry raised for any purpose whatsoever.

DESCRIPTION OF THE PRIOR ART

It is common practice in raising livestock, to feed additive supplements such as vitamins, minerals, proteins, enzymes, hormones, antibiotics, worm medicines, and other nutritional supplements and medications to provide a balanced diet, and to protect the livestock from disease.

Heretofore the most common method of feeding additives to livestock has comprised premixing the desired additives together in dry concentrate form, usually with some dry carrier material and then storing the premixed additives for a period of time until ready for use. The additive premixture is eventually mixed with the livestock's daily feed ration. However, with this method it is extremely difficult to obtain an even distribution of additives throughout the feed ration because usually the proportion of additives to feed is very small, the mixing of premix and feed is not thorough and the differences in particle sizes and weights of the various additives are great. Thus an animal might receive an overdose of one additive and accompanying toxic and other detrimental side effects, and yet receive less than its minimum daily requirement of another additive. Then too, the total amount of premix received is likely to vary greatly from one animal to another because of nonuniformity of mix and differences in appetites.

Another problem in feeding livestock premixed additives is that both the additive premix itself and the feed ration and premix blend are often stored for long periods of time before being consumed, resulting in some additives losing their potency through chemical breakdown and combination with other materials to which they are subjected during storage.

An additional problem in premixing additives is that the effects of heat, moisture and abrasion which take place in the processing of certain premixes have been shown to break down water-soluble protective coatings which have been especially applied to certain biological additives to prevent biological breakdown prior to assimilation by the livestock. On the other hand, there are protective coatings, especially oils, which are added to certain additives to protect them against moisture, abrasion and heat involved in processing. Such coatings have been shown to form a coating around the additives so that only a percentage of a particular additive is available for assimilation by the livestock.

Other disadvantages of premixing additives include the expense, labor and inconvenience of storing and handling large quantities of premixed additive, the possibility of spoilage, the biological unavailability of certain additives when premixed with feeds which chemically tie up the additives to form water-insoluble feeds, and the impossibility of changing the proportion of a premixture after it has once been made up.

The above and other disadvantages involved in premixing dry additives with livestock feed rations have led others to try dispensing premixed liquid concentrate solutions of additives through livestock drinking water systems. However, the solubility of certain mineral salt additives in water is very limited so that either the vessels for storing solutions containing such premixed additives would have to be impractically large, or if of manageable size, the vessels would have to be refilled several times a day.

Other disadvantages of using a liquid premix include (1) the loss of potency of biochemical additives when placed in concentrated solutions of mineral additives, (2) the limited number of mineral salt additives which can be premixed together in concentrated solutions for any appreciable length of time without interacting and thereby losing their biological availability to livestock, (3) the relatively rapid loss of potency of many biological additives when placed either alone or together in solution, especially for long periods of time, and (4) the high cost and labor involved in premixing additives in liquid form as compared to the relatively low purchase price of individual dry additive concentrates.

Livestock have also been fed additives in the past by making the individual additives, or a premix thereof, freely available to the livestock apart from their feed ration and drinking water. With this method, however, it is even more improbable than with the previously discussed methods that an individual animal will consume the desired amounts of the various additives offered, such being left almost entirely to chance.

SUMMARY OF THE INVENTION

Accordingly, a primary object of the present invention is to provide a new and improved method of delivering livestock feed additive concentrates in a fluent carrier material such as drinking water, by adding the concentrates separately but simultaneously to a continuous flow of the diluting fluent carrier just prior to the time of intended consumption.

Another primary object is to provide a new and improved apparatus for carrying out the above method.

Another, more specific, object is to provide a new and improved method of an apparatus for feeding livestock several additive concentrates at the same time without the necesity of premixing the additives together in either dry or liquid form long before the time of intended use.

Another object is to provide a new and improved method of and apparatus for feeding livestock additives whereby the amounts of various additives made available to and consumed by livestock can be closely and accurately controlled and maintained, thereby minimizing the chance of any animal receiving an overdose of any additive and increasing greatly the probability that every animal will receive its daily requirements of additives.

Still another object is to provide a new and improved method of and apparatus for feeding livestock additives whereby virtually all of an additive disposed will be consumed, thereby eliminating wastage.

A further object is provide a new and improved method of and apparatus for feeding livestock additives whereby an additive will ordinarily be consumed within a short time after it is dispensed into the fluent carrier so that the additive will be likely to retain most, if not all, of its potency until consumed.

Another important object is to provide a versatile method of and apparatus for feeding livestock additives which enable the feeding of livestock any combination of several additives without detrimental interaction between the additives administered.

Still another object is to provide a method of and apparatus for feeding livestock which enable the simple and rapid changing from one combination of feed additives to another.

Another object is to provide a method and apparatus as aforesaid which enable the changing of the quantities and proportions of the various additives administered independently and with simplicity.

Still another object is to provide a method of administering additives to livestock which is less expensive, simpler, more versatile and more effective than prior methods.

BRIEF DESCRIPTION OF THE DRAWINGS

The above and other objects and advantages of the present invention will become more apparent from the following detailed description which proceeds with reference to the accompanying drawings wherein.

DETAILED DESCRIPTION

Figure 1:
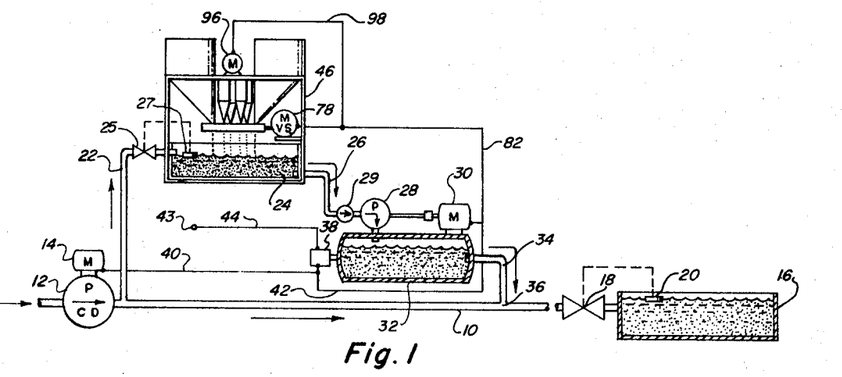
FIG. 1 is a schematic elevational view showing one form of the apparatus in accordance with the invention.

FIG. 1 form of apparatus

With reference to the drawings, FIG. 1 illustrates a demand water-pressure system for carrying out the present method, the system including a main water conduit 10 through which water is pumped from a well or other remote source (not shown) by a constant-demand pump 12 driven by a motor 14 to a livestock watering trough 16. The outlet end of the maine line is provided with a float valve 18 having a float 20 to admit additional water into the trough only when the water within the trough drops below a predetermined level determined by an adjustment on the float valve. A branch conduit, or watercouse, 22 diverts a portion of the flow from the main line into an open additive-receiving and mixing tank 24 upstream from the watering trough. The outlet end of branch line 22 at the mixing tank is fitted with a float valve 25, the float portion 27 of which floats on the surface of the water in the tank. The float is adjusted to close the valve 25 when the tank is full to prevent overflow of the latter should the rate of discharge into the tank exceed the outflow therefrom. An intermediate portion 26 of the branch line leads from an outlet in the tank to a second pump 28 which is driven by an electric motor 30, to pump water from the mixing tank into an enclosed pressure tank 32. A check valve 29 in line 26 permits flown only in a direction toward the pressure tank. From the pressure tank an outflow portion 34 of the branch line directs the branch line flow back into the main line 10 at a junction 36 of the two lines upstream from float valve 18.

Operatively connected to the pressure tank 32 is a pressure-sensitive electrical switch 38, which is tied into the electrical circuits of both the main line pump motor 14 and the branch line pump motor 30 by conductors 40 and 42 and to an electrical input supply source 43 by conductor 44.

Figure 2:
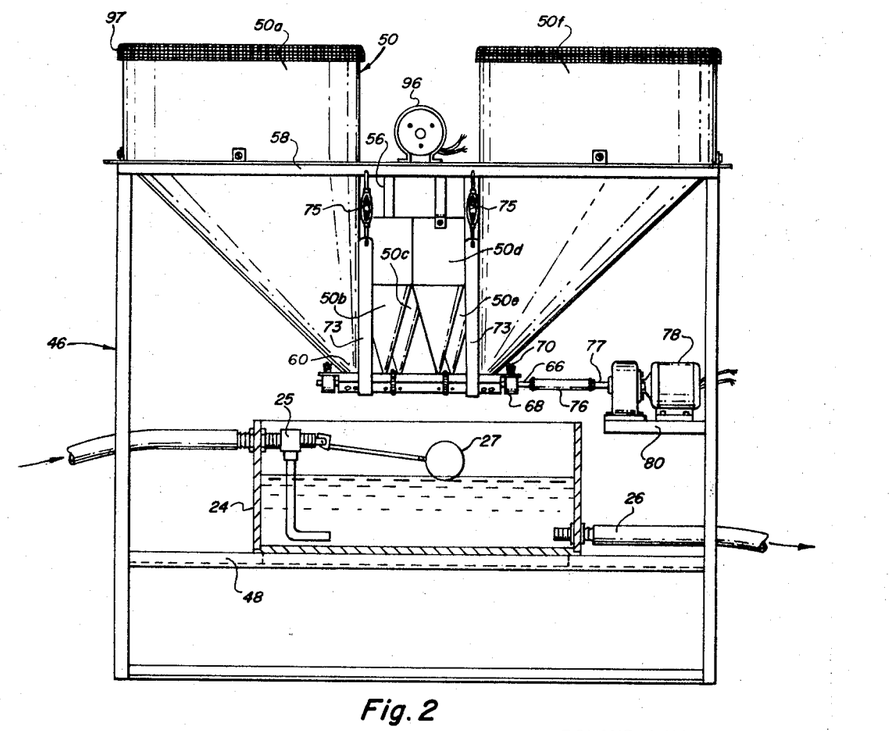
FIG. 2 is an enlarged, somewhat schematic elevational view, partly in section, showing the details of the additive storage, metering and dispensing portion of the apparatus of FIG. 1.
Figure 7:
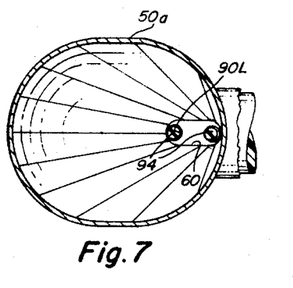
FIG. 7 is a horizontal sectional view through one of the large storage bins taken along the line 7—7 of FIG. 3, but with the additive removed therefrom for clarity.
Figure 8:
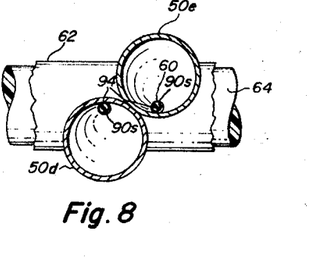
FIG. 8 is a sectional view taken along the line 8—8 of FIG. 3 through two of the smaller storage bins.

Referring especially to FIG. 2, the mixing tank 24 is mounted in an open rectangular frame 46 on horizontal cross frame members 48. Also mounted within the frame vertically above the mixing tank are six additive storage bins 50, including two large end bins 50a and 50f for storing additives that must be dispensed in large quantities and four smaller bins 50b–50e mounted between the larger bins by straps 56 affixed to top frame members 58. A sidewall portion of each bin 50 tapers inwardly toward a lower end opening 60, clearly shown in FIGS. 3, 7 and 8, to promote smooth and easy flow of additives by gravity from the bins. The bottom openings in the larger bins are larger than the same openings in the smaller bins whereby the larger bins are capable of dispensing additives at a higher rate than the smaller bins.

Figures 3, 4, 5, 6:
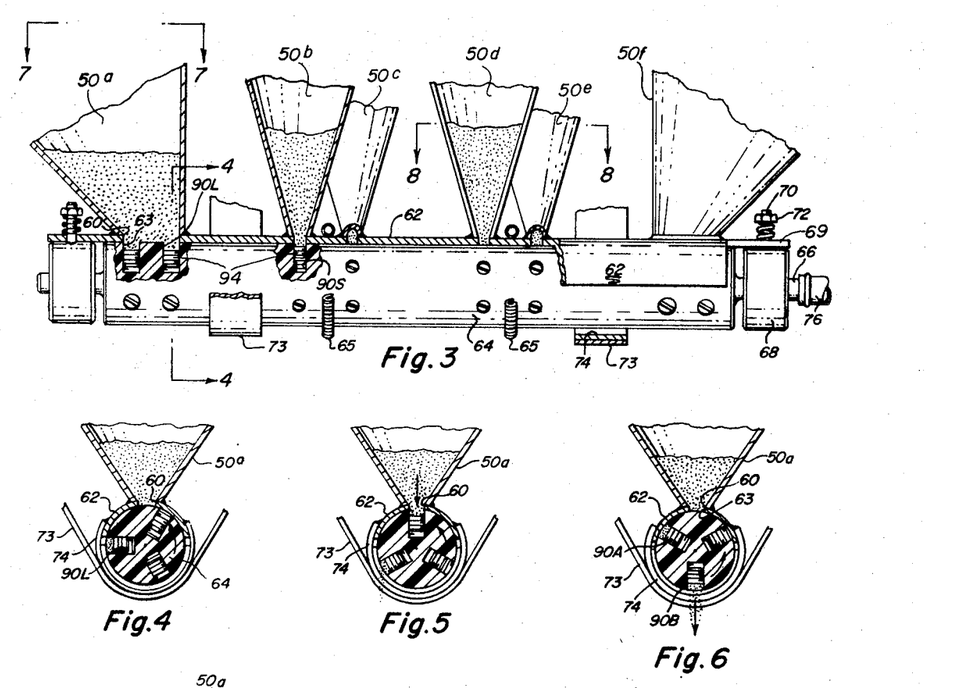
FIG. 3 is a side view, partly in section and on a greatly enlarged scale, of the dispensing means and adjacent portions of the additive storage means of FIG. 2.
FIGS. 4 through 6 are transverse sectional views on the same scale as FIG. 3, taken approximately along the line 4—4 of FIG. 3 illustrating the operation of the dispensing rod by showing a section of the rod in various rotative positions relative to an associated storage bin.

Referring to FIG. 3, the lower end of each bin is anchored, as for example by welding, to a semicylindrical upper bearing member 62 which is provided with openings 63 therethrough in register with the bottom bin openings. An elongate, cylindrical metering and dispensing rod 64 extends horizontally beneath the bins. The rod has a smooth outer surface which conforms to, and nests snugly against, the cylindrically concave undersurface of the upper bearing member 62 with the aid of annular coil springs 65 so as to prevent the unintentional leakage of additives from between the rod and the bearing member. The opposite ends of the rod carry stub shafts 66 which are journaled in end bearings 68 affixed to end extensions 69 of the upper bearing member by spring-loaded fasteners 70 and take-up nuts 72.

A pair of metal sling straps 73 pass under the metering rod and engage curved support bands 74 (FIG. 4) spaced from the rod and affixed at their upper ends to the upper bearing member 62. The straps are adjustably secured by turnbuckles 75 to the top frame members 58 to secure the dispenser assembly to the frame structure in relatively rigid fashion.

The stub shaft 66 at one end of the metering rod is connected by a flexible tube coupling 76 to a drive shaft 77 of a variable speed, gear head electric motor 78 mounted on a support bracket 80 carried by the frame 46. The motor is supplied electrical current through a conductor 82 connected to the pressure switch 38.

The metering rod is preferably made of a hard plastic material that will slide easily relative to the undersurface of the bearing member 62. As shown most clearly in FIGS. 3 through 6, the metering rod includes several rows of blind surface openings 90 therein for carrying additive, with each row extending circumferentially of the rod in alignment beneath one of the bottom bin openings and being spaced longitudinally from the other rows of openings. With respect to each of the large bins, there are two rows of cooperative rod openings 90L, whereas there is only one row of rod openings 90S for each of the small bins. The rod openings 90L for each of the larger bins are also of larger diameter than the openings 90S for the smaller bins so that the rod will dispense additive from the large bins at a greater rate than from the small bins.

Each of the rod openings 90L and 90S is internally threaded to receive a set screw 94 which is substantially shorter in length than the depth of the opening into which it is threaded so that the egective size of each opening can be individually adjusted to vary the additive-carrying capacity thereof.

Referring to the row of three large rod openings 90L for the bin 50a as shown progressively in FIGS. 4 through 6, it will be apparent that as each rod opening in a row is brought into registration with a bin opening through rotation of the rod in the arrow-indicated direction, additive particles flow into such opening and fill the same. As the filled rod opening passes the bin opening, the bearing member 62 levels off the additive at the top of the rod opening to prevent such opening from carrying any more additive than its actual capacity. Then the additive-loaded opening will begin to dispense its load when it rotates into a downwardly opening position as shown by one of the openings in FIG. 5, and will complete its dumping action when in its most downward position as shown in FIG. 6. Each opening of each row will thus alternatively receive a load of additive and dump its load as the rod rotates.

As shown clearly in FIGS. 1 and 2, an electric vibrator motor 96 is mounted on top frame member 58 to facilitate the flow of additives from the bins into the openings 90 of the metering rod and from the rod openings to the mixing tank. Electric current is supplied to the vibrator by a conductor 98 connected to the pressure switch 38.

From the foregoing, it will be apparent that the rate at which any particular additive is dispensed can be controlled by varying the set screw settings for the rod openings carrying such additive, whereas the rate at which all additives are dispensed from their bins can be most conveniently controlled by varying the speed of rotation of the metering rod.

Operation of FIG. 1 form

In practice, some or all of the bins, as desired, are filled each with a different additive in dry particle form, with the larger bins being filled with those additives that are required in large quantities by the particular kind of livestock fed. Preferably the additives are poured through a screen, or sieve, 97 placed over the tops of the bins in filling the same so that any non-flowing matter will be removed from the additives entering the bins. After being filled, the bins may be covered if desired to prevent moisture and contaminates from entering. The metering rod openings for each bin are set in accordance with the desired concentration of each additive in the drinking water. In most instances this is determined by a trial-and-error process through determinations of additive weight per unit volume of water and/or through analysis of the concentration of additives in the water at the drinking trough and subsequent adjustments, as require, of the set-screw settings and speed of motor 30 until the desired concentrations are obtained. After the dispensing apparatus is adjusted to dispense the desired amounts of the several additives, the livestock to be fed would be permitted to water at the trough, after which the apparatus operates as follows.

With the trough filled, the float valve 18 is closed, and there is a sufficiently high water pressure in pressure tank 32 to maintain pressure-sensitive switch 38 in its open position. In such position the circuits to the pump motors 14 and 30, rod motor 78, and vibrator 96 are all open so that both the water feed system and additive-dispensing apparatus are shut down. A high pressure is maintained in pressure tank 32 by check valve 29 in line 26 and valve 18 at the outlet to the trough. Thus the pressure in tank 32 can be reduced only by opening float valve 18, and this occurs only when the water level in trough 16 drops sufficiently low to cause float 20 to open such valve.

The opening of valve 18 and resultant pressure drop in the pressure tank causes pressure switch 38 to close and thereby complete the circuits to the two pump motors, dispenser motor and vibrator. Thereafter the rod rotates to dispense metered quantities of the several additives from their bins into the mixing tank, and at the same time additive-carrying water is pumped from such tank and through line 26, pressure tank 32 and line 34 into the main line 10 to intermix with the main flow induced by pump 12, after which the combined flows pass into the trough.

The various motors remain energized to maintain the flow of water through the system and the mixing of additive into the water until the watering trough is refilled to a predetermined level, at which point the float valve 18 closes to prevent further flow into the trough. Closing of the float valve 18 and the momentary continuation thereafter of the pumping of water into tank 32 results in a rise in pressure within such tank to a sufficiently high level to reopen pressure switch 38 and thus de-energize all of the motors to shut down the flow of water and the discharge of additive. Water flow and the dispensing of additive are reinstituted periodically thereafter, in response to a pressure drop in the pressure tank caused, as previously noted, by a drop in water level within the trough.

Figure 9:
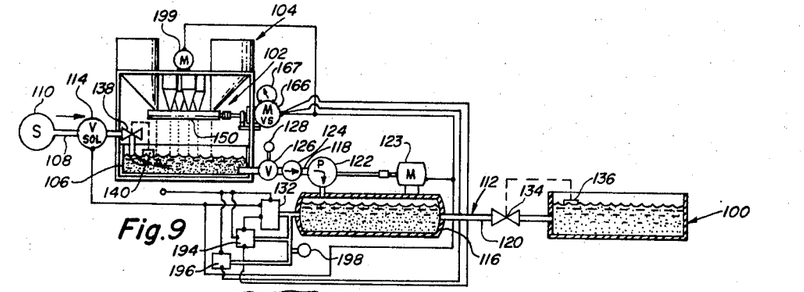
FIG. 9 is a schematic elevational view illustrating another form of the apparatus in accordance with the invention.

FIG. 9 form of apparatus

With reference to FIG. 9, a modified apparatus in accordance with the invention is disclosed schematically. This modification has been found to be preferred in most instances to the embodiment of FIG. 1 because of its greater overall simplicity of operation and adjustment. The modified apparatus includes the same basic elements as the one originally described, including a watering trough or other receiving station 100, additive-dispensing means 102, a plurality of supply bins 104 above the dispensing means, and an additive-receiving and mixing tank 106 positioned beneath the dispensing means. Unlike the FIG. 1 embodiment, however, the entire flow of water is conveyed through a single conduit 108 from a source 110 under either gravity or pump pressure to the mixing tank 106, without first diverting any of the flow. A second conduit 112 conveys the entire flow from the mixing tank 106 directly to the watering trough, the bypass of the FIG. 1 embodiment being thus eliminated altogether.

Although the supply conduit 108 of the system might include a pump as in the first-described form of the apparatus, this is not necessary, and in fact the line 108 could be connected to a tap providing a constant source of water under pressure or directly to an elevated storage reservoir providing gravity flow. In any event, in the FIG. 9 embodiment it is assumed that the source 110 providing water under pressure is not one that can be conveniently shut on and off in response to pressure changes in the conduit 112, so a normally closed solenoid-actuated valve 114 is provided in the line 108 to open in response to a predetermined pressure drop in pressure tank 116 provided in the conduit 112.

The conduit 112 constitutes a secondary pressure system in addition to the pressure source providing water to the mixing tank. Such secondary system includes a pipeline section 118 for conveying water from the mixing tank to the pressure tank 116, and a pipeline section 120 for conveying water from the pressure tank to the watering trough. The line 118 includes a pump 122 driven by electric motor 123, a check valve 124 permitting flow only in a direction toward the pressure tank, and a throttle valve 126 for manually regulating the water level in the mixing trough 106 so as to provide maximum agitation in the mixing trough coupled with an even flow of water under the metering rod. Activation of solenoid valve 114 and pump motor 123 are controlled by pressure-sensitive switch 132 through suitable electrical connections to the latter. Switch 132 is preset to remain open under tank pressures obtained when float valve 132 at the outlet end of line 120 is closed, and to close when the pressure in tank 116 drops through opening of valve 134. Thus the demand pressure system of the apparatus of FIG. 9 operates in the same way as that in the apparatus of FIG. 1.

As in the FIG. 1 embodiment, the line 108 leading into the mixing tank includes a float valve 138 controlled by a float 140 in the mixing tank for preventing overflow of the tank and for maintaining enough water in the tank to prevent overconcentration of additives therein.

Figure 10:
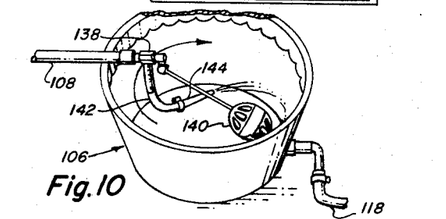
FIG. 10 is a perspective view, on a slightly enlarged scale, showing a modified form of mixing tank in the apparatus of FIG. 9.

FIG. 10 illustrates a modified mixing tank 106 and appurtenances which are preferably used in the apparatus of FIG. 9 and which differs in several respects form the rectangular tank and associated elements in the apparatus of FIG. 2. The mixing tank 106 is circular in horizontal section, or as viewed from above, as shown in FIG. 10, so as to produce a swirling, turbulent flow of water within the tank and thereby promote the intermixing of additives with the water. The outlet end of line 108 includes a downwardly extending portion 142 having a nozzle 144 so as to deliver water into the tank under a high pressure and turbulence. Preferably the nozzle points in a direction which is offset from the center of the tank so as further to promote the aforementioned swirling and turbulent action.

With reference now to FIGS. 11 through 14, the dispensing means 102 used in the apparatus of FIG. 9 differs in several respects from that disclosed in FIG. 3. However, the additive storage bins 104 which feed the dispensing means are of the same general construction as the bins of the preceding embodiment and include both a pair of large capacity bins 104a and 104f and smaller bins 104b–104e.

Figure 11:
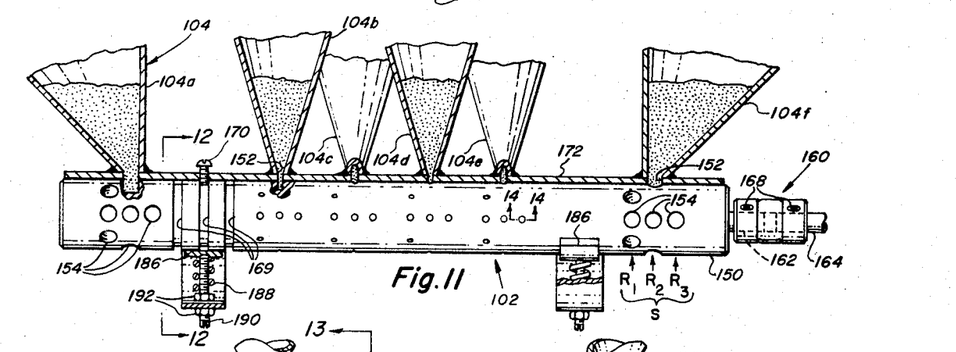
FIG. 11 is a side view partly in section and on a greatly enlarged scale, showing a modified form of additive dispensing means in the apparatus of FIG. 9.

The dispensing means 102 includes a rotatively mounted additive-metering and dispensing rod 150 of cylindrical shape extending horizontally beneath bottom openings 152 of the bins as in the previous embodiment. However, rather than having only a single or double row of openings in registration with each of the bin openings, as in the preceding embodiment, the present rod includes several series S of openings 154 corresponding to the number of bins, with each series including several, in this instance three, rows $R_1$, $R_2$ and $R_3$ of openings in conjunction with each bin. Each row of rod openings in a series extends circumferentially of the rod, and any one of the three may be aligned beneath the corresponding bin opening by a longitudinal, or axial, adjustment of the metering rod.

Longitudinal adjustment of the rod is accomplished through the provision of a flexible sleeve-type coupling 160 which connects a stub shaft 162 at one end of the rod with the drive shaft 164 of a variable speed motor 166 (FIG. 9) which drives the metering rod. The speed of motor 166 is controlled through a rheostat 167. The relative position of rod shaft 162 and motor shaft 164 in the flexible coupling can be changed by loosening and resetting set screws 168 on the coupling.

The metering rod is provided with a series of three endless circumferential slots 169 in its cylindrical surface, which slots are spaced apart center distances corresponding to the center distances between the three rows of openings in each series. A set screw 170 extends through an opening in semicylindrical upper rod bearing member 172 and into one of the three slots 169 to determine and maintain the longitudinal setting of the rod required to align a corresponding one of the three rows of rod openings in each series with its associated bin opening. Thus with the set screw 170 set within the middle one of the three slots 169, the middle one of the three rows in each series is aligned with its corresponding bin opening.

The upper bearing member 172, except as previously noted, functions in the same manner as the bearing member 62 of FIG. 3 in preventing leakage of additives from the bins into the mixing tank.

The quantity of additive material capable of being dispensed into the receiving tank by any given row in a series differs from the quantity capable of being dispensed by each of the other rows in a series, either by providing different sizes of openings in the different rows of a series or by providing a different number of openings in the different rows, or by a combination of the two. For example, in the illustrated rod of FIG. 11, the left-hand row $R_1$ in each series of openings 154 has the greatest additive-dispensing capacity because it has the greatest number of openings whereas the right-hand row $R_3$ of each series has the smallest additive capacity since it has the least number of openings of any of the rows.

In general, the bin openings vary according to the size of the various bins with the largest bins having the largest openings, and the diameters of the rod openings from series to series vary in accordance with the size of bin and bin openings for a given series. Thus the end series of rod openings are considerably larger than the intermediate series of openings. It is important, however, with the present metering rod embodiment that the center distances between corresponding rows in all of the six series shown be approximately equal so that when a row in one series is aligned with its bin opening, the corresponding rows in the other series will be likewise aligned with their respective bin openings.

Although the illustrated rod has three rows of openings in each series, any number of rows could be provided, depending on the number of adjustments desired. However, the length of the rod required will increase with an increase in the number of rows.

Figure 14:
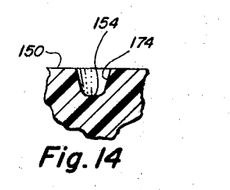
FIG. 14 is a fragmentary sectional view of a small portion of the dispensing rod taken along the line 14—14 of FIG. 11 and shown on a scale greatly enlarged over that of FIG. 11.

As shown in FIG. 14, it is desirable that the sidewalls 174 of the intermediate rod openings of extremely small size be sloped inwardly toward the bottoms of such openings to facilitate the flow of additive particles from the openings when they are in their downward positions.

Figures 12, 13:
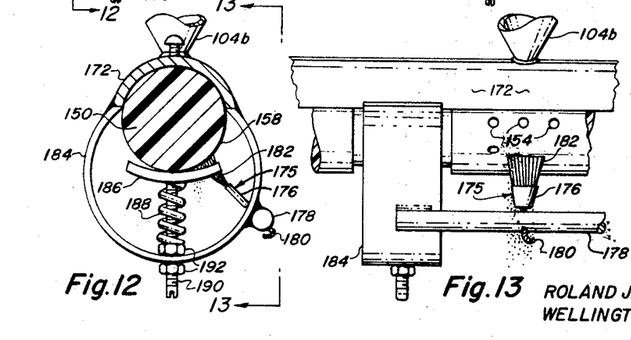
FIG. 12 is a transverse sectional view on the same scale as FIG. 11 taken along the line 12—12 of FIG. 11.
FIG. 13 is a fragmentary side view taken along the line 13—13 of FIG. 12 showing a short length of the complete dispensing means.

An additional feature of the modified dispensing apparatus, as shown in FIGS. 12 and 13, includes a series of brushes 175 mounted in alignment with the bottom openings in the small bins 104b–104e for aiding the removal of additive material from the small rod openings. Each of the illustrated brushes has a body portion 176 mounted on a support bar 178 by a wire tail 180 which extends through an openings in the bar. The body carries a series of bristles 182 which firmly engage an undersurface portion of the rod and enter the aligned row of rod openings 154, as shown in FIG. 13, as the rod rotates in the arrow-indicated direction, to sweep any remaining additive particles from the openings and into the mixing tank.

The support bar 178 is supported at its opposite ends by a pair of ring members 184 which encircle the lower portion of the metering rod at a considerable distance therefrom and are fixed to the opposite lower extremities of the upper bearing member 172 as clearly shown in FIG. 12. Another purpose of the ring members 184 is to provide a support for a pair of lower rod bearing members 186 which urge the metering rod 150 upwardly into snug engagement with the inner surface of the upper bearing member 172 while providing bearing surfaces to permit rotation of the rod relative to such bearing members. Each lower bearing member is urged against the bottom of the rod by an adjustable spring bolt assembly, including coil spring 188, bolt 190 and lock nuts 192.

Operation of FIG. 9 form of apparatus

Other than the difference in the manner of adjustment of the metering rod 150 to vary the quantity of additives dispensed into the receiving tank, the operation of the modified apparatus is substantially the same as that of the original apparatus. That is, when the water level in the trough 100 drops below a predetermined lower level as determined by adjustment of the float 136, the float valve 134 opens, resulting in a drop in pressure within the pressure tank 116. The drop in pressure causes master pressure sensitive switch 132 to close so that solenoid 114, pump motor 123, rod motor 166 and a vibrator 199 all become energized. Thus, the solenoid valve opens and the pump forces water through conduit 112 into the trough while the rod dispenses additive into the mixing tank.

When the water in the trough 100 rises to a sufficient level to close the float valve 134, the pressure in the tank 116 again builds up to open master pressure-sensitive switch 132 and thereby shut down the flow through the system and the dispensing of additives.

To prevent an overfeeding of additives in the case that there is a loss of water pressure at source 110 and/or line 108, a low pressure safety switch 196 is mounted such that when there is insufficient water pressure in line 108 to maintain a sufficient predetermined minimum pressure in the pressure tank 116, the low pressure safety switch 196 opens the circuit only to the metering rod motor 166. Hence, should there be at least some water pressure at source 110 and in line 108, all systems except the metering rod motor 166 would operate to supply water to the livestock. At such time when the water pressure in pressure tank 116 rises to a level above that at which the low pressure safety switch 196 is set, an automatic reset within the switch closes the switch allowing the metering rod motor to restart.

Additionally, a high pressure safety switch 194 is mounted in conjunction with the master pressure-senstive switch 132 such that a failure of the master switch to operate under a tank pressure normally high enough to open such switch results in the opening of the metering rod motor circuit only, by the high pressure safety switch 194. Hence, additives are not wasted. The capacity of the pump 122 prevents pressure rises which are above the strength of the pressure tank 116. Thus, water will continue to be supplied on demand despite a failure of the master pressure-sensitive switch 132.

Figures 15, 16:
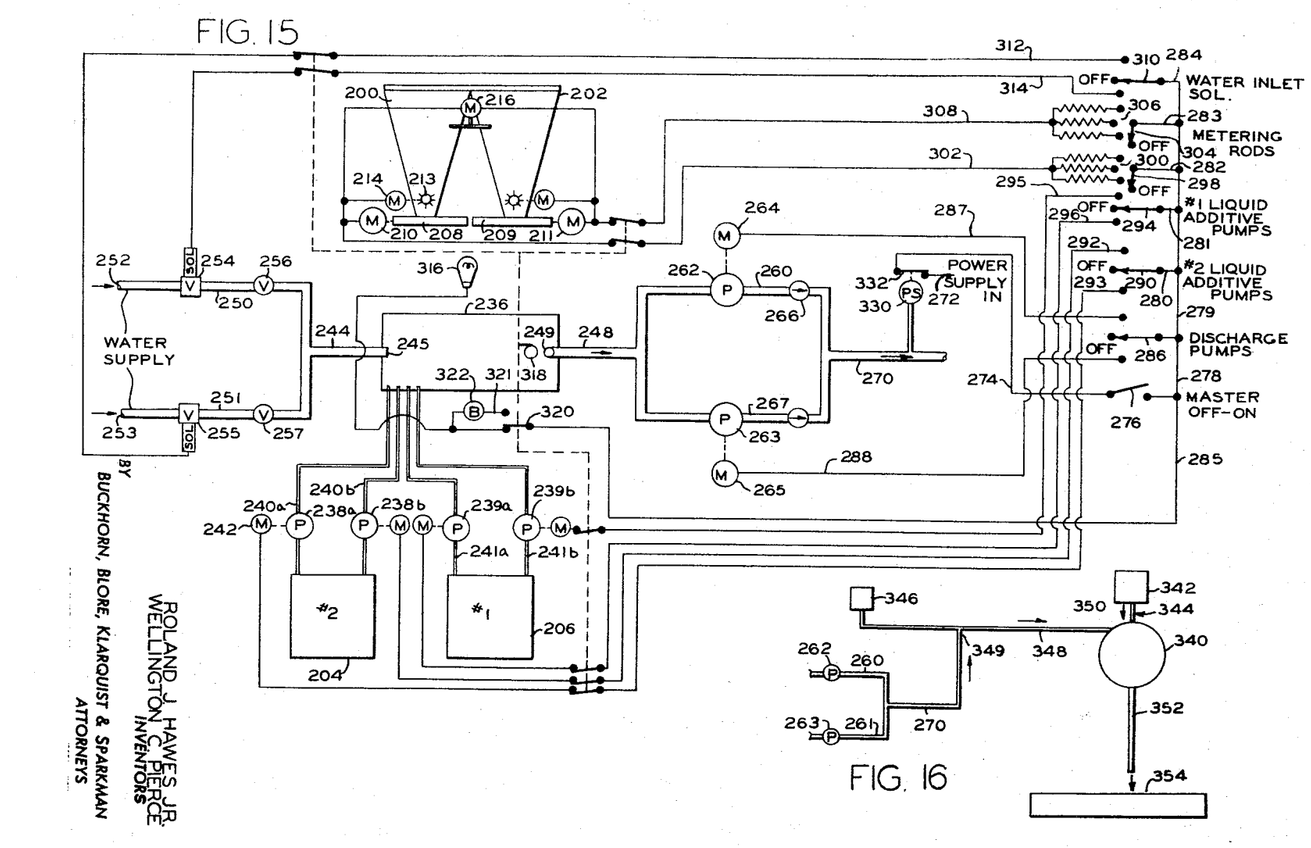
FIG. 15 is a diagram of another apparatus in accordance with the invention.
FIG. 16 is a diagram illustrating the use of the apparatus of FIG. 15 in conjunction with a livestock feed mill.

FIG. 15 forms of apparatus

FIG. 15 illustrates schematically another embodiment of the dispensing apparatus including dry additive storage bins 200, 202 and liquid additive storage containers 204, 206. Dry additive bin 200 has its own metering rod 208, which is rotatable independently of a metering rod 209 for the other bin 202 by an electric motor 210, operable independently of a similar motor 211 for rod 209. Bin 200 also has its own dry additive agitator 213 by an electric motor 214 independently of an agitator and motor for the other bin. A vibrator 216 is mounted on the bin structure and operates concurrently with either one of the two metering rods 208 and 209.

Liquid additive concentrates are dispensed into receiving section 236 of the conduit system for the liquid carrier material by positive displacement pumps 238a, 238b, 239a, 239c which pump the liquid additive from the containers 204, 206 through discharge lines 240a, 240b, 241a, 241b, respectively. Each of the four pumps is driven by its own individual electric motor 242. Each of the two pumps for each liquid additive container has a different pumping capacity than the other and normally only one pump is operated at a time so that one of two different dispensing rates may be selected for each type of additive being used. Of course, more than two pumps, each having a different pumping capacity could be provided in connection with each liquid additive container, or alternatively a single variable displacement pump or a fixed displacement pump with variable speed motor could be provided in place of the separate positive displacement pumps to provide a variable discharge rate from each liquid additive container. However, it has been found in practice that less cost and maintenance is required to provide several low cost pumps of different capacities as shown, rather than a single variable discharge pump to provide variable discharge rates from each container. A gravity flow liquid concentrate metering system could also be provided instead of the pumping system shown.

The conduit system for the liquid carrier includes, in addition to the receiving section 236, a carrier intake conduit section 244 leading from a source of water or other liquid carrier supply and emptying into the receiving section 236 at an inlet 245. The conduit system also includes a discharge conduit section 248 leading from an outlet 249 of the receiving section directly to a receiving station such as a livestock or poultry watering trough, a pressure tank as shown in FIG. 1 in a demand pressure system, or a feed mill as shown in FIG. 16, where the additive-bearing carrier would be mixed with the livestock or poultry feed ration before the additive and feed mix would be delivered to the animals.

Intake conduit 244 includes a pair of intake passages 250, 251 connected in parallel with one another so as to provide two inlets 252, 253 to the dispensing machine, each of which is connected to an outside source of water. Each of the dual intake passages is provided with a normally closed solenoid actuated shutoff valve 254, 255 and separate manually operable flow control valves 256, 257 for varying the rate of inflow of liquid into receiving tank 236. The purpose of the dual intake passages is to obviate the need for shutting down the entire machine should one of the solenoid shutoff valves fail temporarily. Only one of the intake passages 250, 251 is used at any one time. The breakdown of, for example, solenoid valve 254 when intake passage 250 is in use would merely require the switching of the inflow of liquid into intake passage 251 and through its solenoid valve 255 while valve 254 is being repaired.

Discharge conduit 248 is provided with a pair of discharge passages 260, 261 connected in parallel with one another, having their own discharge pumps 262, 263 driven by separate electric motors 264, 265, respectively. Each of the parallel discharge passages is provided with a check valve 266, 267 permitting flow in the downstream direction only so that when only one of the passages is in use liquid cannot flow through the other passage in an upstream direction. Both parallel discharge passages flow into a common discharge main 270 leading to a watering trough, pressure tank or feed mill. Parallel discharge passages are provided for the same reason that parallel intake passages are used, namely, the breakdown of the discharge pump in one passage permits use of the other passage and its pump while the inoperative pump is being repaired, thereby preventing shutdown of the entire machine.

The control system for the machine is designed for maximum versatility and variation in additive metering rates. Such system includes a connection 272 of a main electrical power conductor 274 to a power supply. Main line 274 leads to a master ON-OFF switch 276, which when closed supplies power through a lateral line 278 to a discharge pump circuit 279, liquid additive pump circuits 280, 281, metering rod circuits 282, 283 and water inlet solenoid circuit 284 as well as to a signal light circuit 285.

The discharge pump circuit includes a three-position selector switch 286. This switch has a first OFF position, a second position in which power is conducted through a line 287 to motor 264 to drive discharge pump 262, and a third position in which power is conducted through line 288 to motor 265 to drive discharge pump 263.

Liquid additive pump circuit 280 includes a three-position switch 290 having a first OFF position, a second position in which power is conducted through a line 292 to the motor which drives additive pump 238b and a third position in which power is conducted through a line 293 to the motor which drives additive pump 238a of container 204.

Liquid additive pump circuit 281 includes a three-position switch 294 having a first OFF position, a second position in which power is conducted through a line 295 to the motor which drives additive pump 239b and a third position in which power is conducted through a line 296 to the motor which drives additive pump 239a of container 206.

Metering rod circuit 282 includes a four-position selector 298. This switch includes a first, OFF position and second, third and fourth positions in which power is conducted to different points on a resistor 300 whereby power at different levels is conducted through a line 302 to motor 210 for driving metering rod 208 at one of three different predetermined speeds. Line 302 also supplies power to agitator motor 214 for bin 200 and vibrator motor 216 when metering rod motor 210 is energized.

Metering rod circuit 283 includes a four-position selector switch 304 having a first OFF position and second, third and fourth positions in which power is supplied to different points on a resistor 306 so that power is conducted through a line 308 to metering rod motor 211 for rotating metering rod 209 at one of three different predetermined speeds. Line 308 also supplies power to the agitator motor for bin 202 and vibrator motor 216 when metering rod motor 211 is energized.

Water inlet solenoid circuit 284 includes a three-position switch 310. This switch has a first OFF position, a second position in which power is conducted through a line 312 to inlet solenoid valve 255 of passage 251 for opening the same, and a third position in which power is conducted through line 314 to inlet solenoid valve 254 of passage 250 for opening the same.

When master OFF-ON switch 276 is closed, power is also supplied through line 285 to a light 316 to indicate that the machine is in operation. However, receiving tank 236 is provided with a float 318 or other means for sensing the level of liquid at the discharge end of receiving section 236 operatively connected to a float-controlled switch 320 in light circuit 285 so that when the level of liquid within the receiving section rises to a predetermined upper limit level, float-control switch 320 opens primary light circuit 285 and at the same time closes a secondary circuit through a parallel line 321 in which a blinker switch 322 is connected to cause light 316 to blink, indicating that the machine requires attention.

Float 318 is also operatively connected to switching means in metering rod lines 302, 308, in water inlet solenoid lines 312, 314 and in additive pump lines 292, 293, 295, 296 in a manner so as to interrupt the supply of power to the metering rod motors, additive pump motors and inlet valve solenoids 254, 255. The offset of this is to shut off the supply of liquid carrier to the receiving section and to shut down all additive dispensing operations until the level of liquid within the receiving section drops to a safe level, whereupon the various float-controlled switches will reclose to permit the metering rods, additive pumps and preselected inlet valve to reopen. During a shutdown as aforesaid because of a high liquid level in the receiving tank, the selected discharge pump 262 or 263 continues to operate to lower the liquid level in the receiving tank.

Discharge main 270 of the conduit system includes a high pressure sensing means 330 which senses downstream pressure in the discharge main and acts to open a pressure-activated switch 332 in the main power supply line 274 when hydraulic pressure rises to a predetermined maximum in passage 270, thereby cutting off power to the entire machine and effectively shutting it down completely.

Thus, unlike the apparatus of FIGS. 1 and 9, the apparatus of FIG. 15 is capable of dispensing additives in dry or liquid concentrate form, and into any sort of additive receiving station, whether a pressure tank or watering trough as shown in FIG. 1, or a feed mill as shown in FIG. 16. The apparatus of FIG. 15 can also handle water-insoluble dry additives in suspension when used in conjunction with a feed mill.

FEED MILL APPLICATIONS

FIG. 16 illustrates the integration of an additive dispensing machine such as that described in FIG. 15 with a feed mill apparatus so that additive-bearing fluent carrier material is mixed with feed ingredients in the mill and then transported by conveyor truck or other transporting means to livestock or poultry feed troughs.

The feed mill includes a feed mixing means such as a molassifier 340 which is of well-known construction in the art and a source 342 of dry premixed feed ingredients supplied to the molassifier through a conveyor line 344. The mill also includes a source 346 of molasses or other liquid feed ingredients such as liquid urea which is piped to the molassifier through a conduit 348, whereby the dry feed ingredients and liquid feed ingredients are intermixed within the molassifier. Discharge main 270a from a dispensing apparatus like that of FIG. 15 is connected to the liquid molasses pipe 348 at 349 upstream from the molassifier. Thus the liquid additive-bearing mixture is then injected into the molassifier at 350 so that the various additives are intermixed with the feed ration within the molassifier and discharged with the feed ration through a discharge means 352 into a waiting truck or other conveyor device, which then immediately transports the additive and feed mixture to a livestock or poultry feed trough 354.

With such an arrangement, the electrical power supply for the feed mill and for the additive dispensing apparatus can be intertied through a common master switch so that the dispensing machine will operate concurrently with the feed mill. The rate of metering of the various additives in the dispensing apparatus and the rate of delivery of the carrier into the molasses pipe are carefully correlated with the rate of delivery of molasses through line 348 and other feed ingredients through line 344 to the molassifier so that a feed ration will have precisely the desired percentages of the various feed additives in the total ration. Moreover, the additives will be uniformly mixed with the feed ration by reason of the injection of the additives in a liquid carrier into the molassifier.

Other methods of integrating the flow of additive-bearing carrier with a feed mill operation could also be used, depending on the sort of feed mill being utilized. For example, the carrier flow could be injected or sprayed directly into a molassifier apart from the molasses and other feed ingredients. In a so-called percentage-type feed mill, a constant flow of carrier material bearing constant concentrations of various additives could be added to the percentage mill along with other feed ingredients at a rate proportionate to the rates of addition of such other ingredients. In still other feed mills where various ingredients are added by weight, the carrier could also be introduced on a weight basis to obtain the desired proportions of different additives to feed.

SUMMARY OF METHOD

Summarizing the method carried out by the illustrative apparatus, the method includes in its broadest aspects the storing of several feed additive concentrates separately and the depositing of measured amounts of such additives separately but concurrently into a body of flowing water or other fluent carrier material which flows continuously to a receiving station. Both the dispensing of additives and the flow of additive carrier to the receiving station occur only on manually or automatically actuated demand, just prior to the time of intended use so as to preserve the potency of the additives. During any cycle of operation the metering of the various additives is at constant predetermined ratios, and the delivery of such additives to the receiving station during each cycle is at a predetermined rate so that the animal will receive predetermined concentrations of the various additives with its drinking water or feed ration. Furthermore, during the additive-dispensing operation the flow of carrier is maintained at least at a level sufficient to prevent the concentrations of additives in the flow from exceeding maximum permissible levels, thereby preserving the optimum effectiveness of the additives.

The advantages of the foregoing method and apparatus over prior forms are numerous. The utilization of water or other liquid as a carrier for additives (1) insures that all animals fed will receive substantially the same ratios of different additives to feed because of uniform mixing, (2) increases the availability of most, if not all, additives to animals' digestive systems, and (3) simplifies the analysis of the amounts of various feed additives being consumed.

Other advantages include (4) the possibility of using some highly toxic additives which heretofore could not be used because of the danger of some animals receiving overdoses thereof, (5) the elimination of wastage of additives through losses in processing, handling and spoilage and (6) the possibility of using unusual or specialty additive combinations formerly unattainable in premix form because of lack of a large demand.

Still other advantages include (7) the adaptability of the method and apparatus to any sort of demand system, whether automatic or manual, and to any type of livestock and poultry, (8) the separation of additives fed until just prior to consumption and intermixing thereafter in relatively dilute liquid solution or dispersion, (9) the possibility of using the method and apparatus to test and observe the effective of various additives, combinations of additives and dosages of livestock through careful control and observation, and (10) the need of using lesser amounts of additives than heretofore required in order to assure that animals receive their daily requirements.

Having illustrated and described several embodiments of the method and apparatus of the invention, it should be apparent to those skilled in the art that the invention permits of modification in arrangement and detail.

We claim:

1. In combination with a livestock watering trough and a demand water supply system for refilling said trough when needed, said system including a source of pressurized water and a conduit from said source to said trough:
   additive-dispensing apparatus including:
   a mixing tank in said conduit upstream from said trough,
   an additive supply source above said tank,
   additive-dispensing means beneath said source for dispensing a measured amount of additive into said tank,
   dispenser-operating means for operating said dispenser,
   a pressure tank in said conduit between said mixing tank and said trough,
   a pump means in said conduit for pumping water from said mixing tank into said pressure tank,
   float valve means in said conduit downstream from said pressure tank for controlling the level of water in said trough,
   said float valve means effecting a rise and fall of pressure in said pressure tank upon closing and opening thereof,
   and pressure-sensing means for sensing the pressure in said pressure tank and for controlling the operation of said pump means and dispenser-operating means by deenergizing both said means upon a rise in tank pressure and by energizing both said means upon a fall in tank pressure.

2. In combination with a livestock watering trough and a demand water supply system for refilling said trough when needed, said system including a source of pressurized water and a conduit from said source to said trough:
   additive-dispensing apparatus including:
   a mixing tank in said conduit upstream from said trough,
   an additive supply source above said tank,
   additive-dispensing means beneath said source for dispensing a measured amount of additive into said tank,
   dispenser-operating means for operating said dispenser,
   a pressure tank in said conduit between said mixing tank and said trough,
   a pump means in said conduit for pumping water from said mixing tank into said pressure tank,
   float valve means in said conduit downstream from said pressure tank for controlling the level of water in said trough,
   said float valve means effecting a rise and fall of pressure in said pressure tank upon closing and opening thereof,
   and pressure-sensing means for sensing the pressure in said pressure tank and for controlling the operation of said pump means and dispenser-operating means by deenergizing both said means upon a rise in tank pressure and by energizing both said means upon a fall in tank pressure,
   and float valve means at the outlet end of said conduit into said mixing tank for controlling the water level in said tank.

3. Apparatus for supplying livestock with feed additives comprising:
   a source of water,
   water receptacle means remote from said source,
   conduit means connecting said source and said receptacle means,
   said conduit means including at least a short enclosed conduit portion for conveying water under pressure to said receptacle means,
   pump means for pumping water into said enclosed conduit portion,
   said enclosed conduit portion including means normally preventing the flow of water from said enclosed conduit portion toward said receptacle means when said receptacle is filled with water to maintain a high pressure in said portion but responsive to a drop in water level within said receptacle below a predetermined level to open said enclosed conduit portion to flow therethrough and lower the pressure therein,
   said conduit means including an additive receiving portion,
   additive-dispensing means adjacent said additive receiving portion for dispensing measured amounts of additive in dry particle form into water flowing through said receiving portion, dispenser and pump-operating means, and control means responsive to a drop in water pressure in said enclosed conduit portion for activating said dispenser and pump-operating means such that additive-bearing water flows into said receptacle.

4. Apparatus according to claim 3 wherein said enclosed conduit portion and said pump means are between said receiving portion and said receptacle, and said conduit means upstream from said receiving portion includes valve means responsive to changes in water level within said portion to control the flow of water into said portion.

5. Apparatus according to claim 3 wherein said receiving portion is of circular configuration and said conduit means upstream from said receiving portion includes a nozzle means at the entrance to said receiving portion such that water entering said receiving portion agitates the water within said receiving portion to promote the intermixing of water in said portion and additive dispensed therein.

6. In an apparatus for adding feed additives to a liquid carrier for feeding livestock including conduit means for conveying said liquid from a source of supply, an additive-receiving tank in said conduit, and a plurality of additive supply bins above said tank:

additive-dispensing means positioned above said tank and beneath said bins for depositing measured quantities of additives into said liquid, within said tank, said dispensing means comprising:

a cylindrical dispensing rod mounted for rotation about its longitudinal axis beneath bottom openings in said bins, means for rotating said rod, said dispensing rod including several series of openings in the cylindrical surface thereof, with each series being positioned adjacent a different one of said bin openings, each of said series including a plurality of rows of said rod openings, with each row of a series extending circumferentially of said rod and being spaced longitudinally of said rod from the adjacent rows of said series, each of said rows of a series being interrelated in size and number of openings with the other rows of the same said series such that each row has a different total additive capacity than the other rows, and means for selectively adjusting said rod longitudinally relative to said bins such that any one of the several rows of each series can be aligned with the corresponding said bin opening whereby the quantity of additive dispensed from a given bin into said tank can be varied.

7. In an apparatus for adding dry feed additives to a liquid for feeding livestock including conduit means for conveying liquid from a source and an additive-receiving section in said conduit means:

additive-dispensing means positioned above said section for depositing a measured quantity of additive into the liquid within said section, said dispensing means comprising in combination:

a plurality of additive supply bins having bottom openings therethrough, a cylindrical dispensing rod mounted for rotation about its longitudinal axis beneath said bin openings, means for rotating said rod, said rod including a plurality of openings in the cylindrical surface thereof, with a different one of said openings being in registration with each of said bin openings during the rotation of said rod, such that additives in dry particle form will flow into said rod openings when the latter are in registration with said bin openings, and such that additives within said rod openings will be deposited into said tank when the additive-filled openings are rotated to positions on the underside of said rod, and brush means mounted in alignment with at least one of said bin openings and positioned such that the bristles thereof engage an undersurface portion of said rod for aiding the removal of additive from said aligned rod openings as said rod rotates.

8. Additive dispensing means according to claim 7 wherein said means for rotating said rod is adjustable to vary the speed of rotation of said rod and thereby the rate at which additive is dispensed into said receiving section.

9. Apparatus according to claim 7 including sieve means on said bins for removing particles of a size larger than a predetermined maximum size from additive material entering said bins upon filling the same.

10. In an apparatus for adding feed additives to a fluent carrier material for feeding livestock including conveyor means for conveying the fluent carrier material from a source to a receiving station:

additive-dispensing means positioned above said conveyor means for depositing measured quantities of several additives into the fluent material on said conveyor means, said dispensing means comprising in combination:

a plurality of additive supply bins having bottom openings, cylindrical dispensing rod means mounted for rotation about the axis thereof beneath said openings, means for rotating said rod means, said rod means including a plurality of recesses in the cylindrical surface thereof, with at least one of said recesses being in registration with each of said bin openings periodically during the rotation of said rod means, so that additives in dry particle form will flow into said recesses when the latter register with said bin openings, and so that additives within said recesses will be deposited into said fluent carrier material when said recesses are rotated to downwardly opening positions, a rod bearing member of generally semicylindrical shape complementary to that of said rod surface, extending between said bin openings and the upper portion of said rod and snugly receiving said upper rod portion, means beneath said rod urging said rod against said bearing member, said bearing member being fixedly mounted relative to said bins and including an opening therethrough in registration with said bin openings, said bearing member being in sealing engagement with the bottom extremities of said bins so as to prevent leakage of additives from said bins and so as to prevent overfilling said rod recesses.

11. In an apparatus for dispensing dry feed additives to livestock, additive-dispensing means for dispensing a plurality of different additives in dry particle form separately but simultaneously into a carrier material, said dispensing means comprising in combination:

a plurality of additive supply bins each having a bottom opening, cylindrical dispensing rod means mounted horizontally for rotation about its longitudinal axis beneath each said bottom opening, means for rotating said rod means, said rod means including a recess means in the cylindrical surface thereof, in alignment with each said bottom opening so that said recess means is periodically in registration with said bottom opening during the rotation of said rod means, and brush means mounted in alignment with at least one of said bottom openings and positioned so that the bristles thereof engage an underportion of said rod means for aiding the removal of additive from said recess as said rod means rotates.

12. A method of administering feed additives to livestock comprising the steps:
  directing a flow of fluent carrier material along a predetermined path to a carrier receiving station,
  storing separately quantities of several different feed additives in concentrated form,
  measuring separately but concurrently predetermined amounts of said different feed additives,
  directing a portion of said flow to a location for receiving said additives,
  discharging said measured amounts of different additives separately but simultaneously into said portion of said flow,
  merging the additive-bearing said portion of said flow with the remaining flow,
  and then directing the total said flow, including the additive-bearing portion, to said receiving station.

13. Apparatus for supplying livestock with feed additives comprising:
  livestock additive-receiving means,
  conduit means for conveying liquid from a source to said additive-receiving means,
  additive dispensing means for measuring and dispensing separately but simultaneously two or more additives into liquid flowing in said conduit means,
  flow inducing means for causing liquid to flow from said source through said conduit means to said additive-receiving means,
  and control means operative to activate and deactivate said dispensing means and said flow-inducing means at the same time so that dispensing occurs only during said flow,
  said conduit means including a primary conduit and a branch conduit branching from said primary conduit upstream from said dispensing means and leading beneath said dispensing means for receiving additives therefrom,
  said branch conduit rejoining said primary conduit downstream from said dispensing means, whereby only a portion of said liquid flow initially receives said additives.

14. A method of administering feed additive supplements to livestock with optimum effectiveness comprising the steps:
  storing separately and with intermixing until just prior to the time of intended consumption several different additive supplements in concentrate form,
  providing a quantity of livestock consumptive carrier material in fluent form,
  just prior to the time of intended use, inducing a continuous flow of the fluent carrier toward a carrier receiving station,
  during the period of said flow only, measuring separately but simultaneously predetermined amounts of said several additive supplement concentrates from their separate storage stations and dispensing the same separately but simultaneously toward said flow of fluent carrier material,
  and further during said period of flow only, causing the several previously measured and dispensed said additive supplement concentrates to enter said flow of fluent carrier at separated points along said flow, thereby maintaining the separation of said several additive supplement concentrates until they enter said flow,
  throughout said period of continuous flow, controlling said flow so as to maintain at least a predetermined minimum rate of flow past the points at which said concentrates are added and to said receiving station, so that throughout said period of flow said additive supplements will be delivered continuously in said flow to said receiving station in concentrations that do not exceed predetermined maximum levels,
  and then presenting the additive supplement-bearing carrier ration to livestock for consumption,
  whereby several additive supplements may be fed simultaneously to said livestock at predetermined dosages within a short time after intermixing said supplements within the diluting fluent carrier so that said several supplements are consumed by the livestock with a minimum potency loss.

15. The method of claim 14 wherein the fluent carrier material is water.

16. The method of claim 14 wherein the additive supplement concentrates are dispensed into a flow of drinking water for the livestock.

17. The method of claim 14 including changing the predetermined rate of dispensing of one or more of said additive supplement concentrates without changing the rate of dispensing of all of the other said several additive concentrates between periods of flow so as to change the dosages of said one or more supplements delivered to the livestock.

18. The method of claim 14 wherein said fluent carrier is a nonviscous liquid and several additive supplement concentrates are in noncohesive dry particle form and said dry particle supplement concentrates are dispensed by gravity into said flow.

19. The method of claim 14 wherein said flow is maintained at a constant predetermined rate throughout said period of flow and wherein said additive supplement concentrates are dispensed at constant predetermined rates throughout said period of flow so that the concentrations of said additive supplement in the carrier reaching said receiving station are constant throughout the period of said flow.

20. Apparatus for supplying livestock with feed additive supplements comprising:
  a source of liquid to be consumed as a part of the basic livestock diet,
  a receiving means for said liquid spaced from said source,
  conduit means interconnecting said source and said receiving means for conveying a flow of said liquid from said source to said receiving means,
  means for inducing a continuous flow of said liquid through said conduit means to said receiver means and for controlling said flow at a predetermined minimum rate,
  a plurality of additive storage means separated from one another adjacent said conduit means, each including a discharge opening separated from the discharge openings of the other said storage means,
  measuring and dispensing means adjacent the discharge openings of said storage means, including means for maintaining the separation of additive materials from the various said storage means while measuring and dispensing the same into said conduit means,
  said conduit means, said storage means and said measuring and dispensing means being interrelated and in direct communication with each other so that the various additive materials from the several said storage means remain segregated from one another until they enter said conduit means,
  means for operating said measuring and dispensing means for each said storage means simultaneously,
  means for controlling the operation of said measuring and dispensing means so that said measuring and dispensing means operate coextensively with the operation of said flow inducing means,
  and means for controlling the rates of dispensing of said additive supplements into said flow and for maintaining said dispensing at predetermined constant rates during any given period of continuous flow so that the quantity of said additive supplements within said liquid delivered to said receiving station within the same flow period will be substantially constant.

21. Apparatus according to claim 20 wherein said means for controlling the rates of dispensing of said additive supplements includes means for individually varying the rate of dispensing from each of said storage means without varying the rate of dispensing from the other said storage means.

22. Apparatus according to claim 20 wherein said measuring and dispensing means comprises horizontally disposed cylindrical rod means mounted for rotation about the horizontal axis thereof beneath the openings of said storage means, and said operating means includes motor means for rotating said rod means, said rod means including a plurality of recesses in the cylindrical surface thereof, with at least one of said recesses being in registration with each of said openings periodically during the rotation thereof, and being directed downwardly toward said conduit means periodically during the rotation thereof, the recesses in registration with each of said openings being separated from the recesses in registration with the other of said openings.

References Cited

UNITED STATES PATENTS

| 1,226,108 | 5/1917 | Olney | 222—132 |
| 2,642,837 | 6/1953 | Schroeder | 119—52 |
| 3,217,694 | 11/1965 | Martin | 119—79 |
| 3,233,864 | 2/1966 | Behlen et al. | 251—243 |

FOREIGN PATENTS 1,313,236  11/1962  France.

HUGH R. CHAMBLEE, *Primary Examiner.*

U.S. Cl. X.R.

119—51.5, 72

PO-1050
(5/69)

UNITED STATES PATENT OFFICE
CERTIFICATE OF CORRECTION

Patent No. 3,437,075                    Dated    April 8, 1969

Inventor(s)    Roland J. Hawes, Jr., and Wellington C. Pierce

It is certified that error appears in the above-identified patent and that said Letters Patent are hereby corrected as shown below:

In the claims, Column 17, Claim 14, Line 45,
"with intermixing" should read --without intermixing--.

SIGNED AND
SEALED

OCT 21 1969

(SEAL)
Attest:

Edward M. Fletcher, Jr.
Attesting Officer

WILLIAM E. SCHUYLER, J..
Commissioner of Patents